United States Patent

Gillandt et al.

[11] Patent Number: 5,806,798
[45] Date of Patent: Sep. 15, 1998

[54] BENDING BEAM TYPE STRUCTURAL COMPONENT ESPECIALLY AIRCRAFT COMPONENT

[75] Inventors: Siegfried Gillandt, Weyhe; Ingo Kroeber, Bremen, both of Germany

[73] Assignee: Daimler-Benz Aerospace Airbus GmbH, Hamburg, Germany

[21] Appl. No.: 614,796

[22] Filed: Mar. 7, 1996

[30] Foreign Application Priority Data

Mar. 15, 1995 [DE] Germany .................. 195 09 340.2

[51] Int. Cl.⁶ ....................................................... B64C 3/26
[52] U.S. Cl. ...................... 244/123; 244/117 R; 244/133
[58] Field of Search ............................... 244/123, 117 R, 244/119, 133; 52/783.1, 795.1; 160/232; 428/166

[56] References Cited

U.S. PATENT DOCUMENTS

| | | | |
|---|---|---|---|
| 2,652,897 | 9/1953 | Le Compte | 244/123 |
| 2,728,702 | 12/1955 | Simon et al. | 244/133 |
| 3,020,986 | 2/1962 | Kirk et al. | 244/123 |
| 3,910,531 | 10/1975 | Leonard | 244/123 |
| 4,183,261 | 1/1980 | Eiselbrecher et al. | |
| 4,228,976 | 10/1980 | Eiselbrecher et al. | |
| 4,411,380 | 10/1983 | McWithey et al. | 244/123 |
| 4,741,945 | 5/1988 | Brant et al. | 428/166 |

FOREIGN PATENT DOCUMENTS 761132  11/1956  United Kingdom ................... 428/166

*Primary Examiner*—Andres Kashnikow
*Assistant Examiner*—Tien Dinh
*Attorney, Agent, or Firm*—W. G. Fasse; W. F. Fasse

[57] ABSTRACT

A structural component, especially a substantially hollow aircraft structural component such as a wing or tail section having an upper chord or shell and a lower chord or shell interconnected to form a substantially hollow bending beam in use, is so constructed that the chord or shell which is primarily taking up tension stress is made of fiber reinforced composite material, while the other chord or shell which primarily takes up compression stress is made of metal. In an aircraft wing the upper wing shell will be made of metal and the lower shell will be made of fiber reinforced composite material. However, the tail plane and elevator assembly will have an upper shell made of fiber reinforced composite material while the lower shell will be made of metal.

10 Claims, 1 Drawing Sheet

BENDING BEAM TYPE STRUCTURAL COMPONENT ESPECIALLY AIRCRAFT COMPONENT

FIELD OF THE INVENTION

The invention relates to structural components in the nature of a hollow profile constructed as a bending beam. Tubular structures form such bending beams. In aircraft construction the wings and the elevator assembly including the tail plane form such hollow profile bending beams.

BACKGROUND INFORMATION

Wings and elevator assemblies including the tail plane of an aircraft are constructed as hollow profile bending beams for producing positive and negative lift forces necessary for flying. The cross-sectional structure of such components must be so constructed that the positive and negative lift forces can be transmitted into the aircraft body including bending moments generated by these forces. The structural components in question formed as aircraft wings or tail units, especially elevator assemblies, normally comprise an upper shell and vertically below the upper shell a lower shell interconnected by ribs, spars or the like. These components are conventionally constricted either of metal material including alloys or of fiber composite materials in which reinforcing fibers are embedded in a matrix such as a resin matrix. Each of these materials have special characteristics that particularly in connection with the use of these materials in aircraft construction may have advantages as well as disadvantages.

German Patent Publication DE-OS 2,657,832 corresponding to U. S. Pat. No. 4,183,261 (Eiselbrecher et al.), issued on Jan. 15, 1980, discloses a structural element, for example for securing an aircraft wing to the aircraft body in which the components for taking up forces causing tension stress and forces causing compression stress are made of fiber composite materials. However, the elements for introducing the forces into the components are made of metal.

German Patent Publication DE-OS 2,721,651 corresponding to U. S. Pat. No. 4,228,976 (Eiselbrecher et al.), issued on Oct. 21, 1980, discloses another component for securing an aircraft wing to an aircraft body in which a cable eye-type metal member is combined with fiber reinforced composite materials. The metal cable eye is coated with synthetic materials and the fibers forming loops around the cable eye are embedded in the synthetic material coating. Additionally, a compression core is made of fiber reinforced composite material. The core bears against the cable eye.

In the above described prior art, the metal elements are intended to introduce the compression forces into a structure made of fiber reinforced composite materials, which on their part are also capable of transmitting tension forces as well as compression forces.

OBJECTS OF THE INVENTION

In view of the above it is the aim of the invention to achieve the following objects singly or in combination:

to construct a bending beam type hollow structural component in such a way that particular material characteristics that are best suited for a purpose are optimally utilized for that purpose while minimizing the influence of adverse material characteristics;

to construct structural hollow bending beam components, especially for the aircraft industry in a weight reducing and cost effective manner;

to use fiber reinforced composite materials primarily for taking up and transmitting loads causing tension stress while using metal materials for primarily taking up and transmitting compression loads causing compression stress; and to construct bending beam type hollow structural components so that they will be less sensitive to notching effects in use.

SUMMARY OF THE INVENTION

The invention takes advantage of the distinctly different characteristics of metal materials and fiber composite materials in their abilities to transmit loads causing tension stress and loads causing compression stress. A bending beam type structural hollow component according to the invention is so constructed that a chord or shell that transmits predominantly tension stress in use is made of fiber reinforced composite material while the other chord or shell that transmits predominantly compression stress in use is made of metal and metal alloys.

In connection with an aircraft wing, the lower wing shell is primarily exposed to tension stress due to the loads particularly positive and negative lift prevailing in flight so that according to the invention the tension stress transmitting chord or shell is made of fiber reinforced composite material. The upper chord or shell of the wing on the other hand, is primarily exposed to compression stress caused by the prevailing forces in flight so that the upper chord or shell is made of a material best adapted to take up compression stress, namely metal. Thus, the invention departs from the conventional approach of making the entire structural component such as a wing of the same material. The load conditions on the tail plane and elevator assembly are opposite to those on the wing. Hence, the upper shell is made of fiber composite material while the lower shell is made of metal.

An especially lightweight construction is achieved if the metal used for the metal portion of the structural component is selected from aluminum and aluminum alloys. Higher strength characteristics are achieved by forming the metal portion of the component of titanium alloys. However, depending on particular uses, the metal portion may also be made of steel alloys.

It has been found that substantial improvements in weight reduction and economy can be achieved while still fulfilling the required strength and useful life conditions of the structural component by making the tension stress exposed components of a fiber composite material in which the fibers are carbon fibers embedded in a synthetic matrix such as a resin matrix.

The present invention is particularly useful in the construction of aircraft wings and in the construction of aircraft tail sections.

BRIEF DESCRIPTION OF THE DRAWINGS

In order that the invention may be clearly understood, it will now be described, by way of example, with reference to the accompanying drawings, wherein:

in FIG. 1;

DETAILED DESCRIPTION OF PREFERRED EXAMPLE EMBODIMENTS AND OF THE BEST MODE OF THE INVENTION

Figure 1:
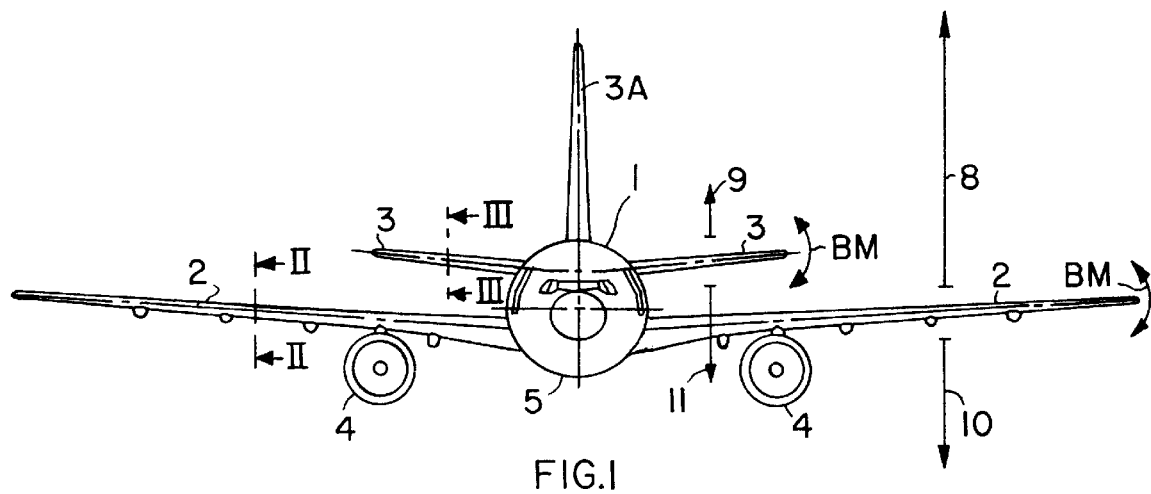
FIG. 1 is a front view onto an aircraft in the direction of the longitudinal aircraft axis to illustrate the primary forces that are effective on the aircraft wings and on the elevator assembly.

FIG. 1 shows an aircraft 1 with wings 2, a horizontal tail plane and elevator assembly 3, a fin and rudder assembly 3A, engines 4, and a body 5. In flight the wings 2 are subject to positive lift forces 8 and negative lift forces 10.

The elevator assembly 3 with its tail plane is also subject to positive lift forces 9 and negative lift forces 11. However, in the elevator assembly the lift generating forces 9 are normally smaller than the negative lift generating forces 11. All lift generating positive forces and negative lift generating forces are the result of the air flow conditions around the wings and tail section.

Figure 2:
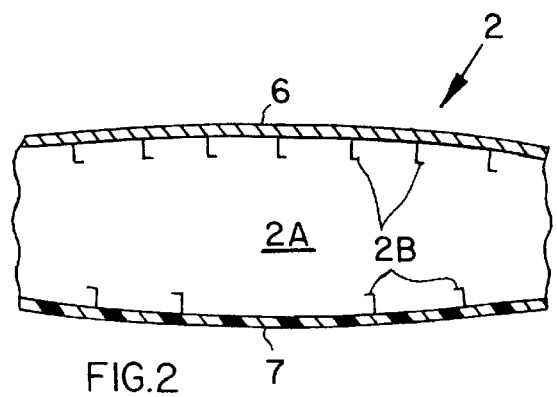
FIG. 2 is a sectional view through the wing along section line II—II.
Figure 3:
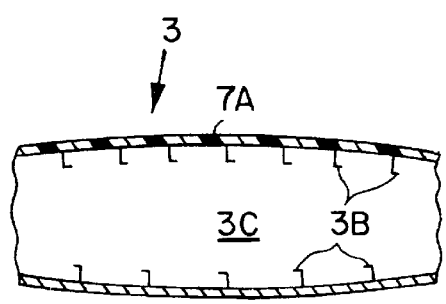
FIG. 3 is a sectional view along section line III—III through the tail plane and elevator assembly in FIG. 1.

The just described forces causing positive and negative lift also expose the wings 2 and the elevator assemblies 3 to bending moments BM. In order to most efficiently take up and transmit these forces and moments, the invention teaches to construct the wings and tail plane and elevator assemblies in such a way that portions of these structural components that are mainly exposed to compression stress are made of metal while component portions mainly exposed to tension stress are made of fiber reinforced composite materials. FIGS. 2 and 3 show the application of this teaching according to the invention.

FIG. 2 shows the cross-section through the wing 2 constructed with an upper shell or chord 6 and a lower shell or chord 7 interconnected by conventional ribs 2A and spars and reinforced by stringers 2B extending substantially in the wingspan direction. This structure forms essentially a hollow bending beam. In flight the beam upper shell 6 is primarily exposed to loads causing compression stress. Therefore, the upper shell or chord 6 of the wing is made of a high strength metal such as aluminum alloys, titanium alloys or steel alloys.

On the other hand the lower shell or chord 7 of the wing is primarily exposed to loads causing tension stress in the lower shell. Therefore, the lower shell 7 is made of fiber reinforced composite material. The composite material comprises a matrix such as resin reinforced by fibers such as carbon fibers, glass fibers, or synthetic fibers, or mixtures of such fibers.

FIG. 3 shows a cross-section through the tail plane and elevator assembly in which the load conditions are reversed compared to the load conditions effective on the wings during flight. The elevator assembly is also formed as a bending beam 3 having an upper chord or shell 7A and a lower chord or shell 6A interconnected by ribs 3C and spars and reinforced by stringers 3B extending substantially crosswise relative to the longitudinal aircraft body axis. In flight, the upper shell 7A is exposed primarily to loads causing tensile stress. Therefore the shell 7A is made of fiber reinforced materials of the type described above. Further, the lower shell 6A is primarily exposed to loads causing compression stress. Therefore, the lower shell 6A is made of metal selected from the above mentioned examples.

The teaching of the invention makes it possible to construct structural elements so that their dimensions become optimal for the intended purpose, whereby particularly optimal weight reductions and cost efficiencies are achieved while still providing the required strength. Another substantial advantage of the invention is seen in that the so constructed structural components have an improved tolerance to notching or nick effects that may be caused by the existence of nicks or notches that may inadvertently occur during manufacturing operations and during operation of the component. It has been found that this tolerance against nicks and notches continues even after frequently returning load conditions thus improving the useful life of any component constructed as taught herein.

According to the invention it is necessary that first the load conditions in actual use of a structural component are analyzed to determine which component portions are primarily exposed to tension stress and which component portions are primarily exposed to compression stress. Depending on the results of such analysis, the component portion that primarily takes up compression stress is then made of metal or metal alloys and the component portion that is primarily taking up tension stress is made of fiber reinforced composite materials, in which fibers are embedded in a synthetic matrix such as resin matrix.

Although the invention has been described with reference to specific example embodiments, it will be appreciated that it is intended to cover all modifications and equivalents within the scope of the appended claims.

What is claimed is:

1. A structural bending beam comprising a first chord predominantly exposed to tension stress in use, a second chord predominantly exposed to compression stress in use, a structure interconnecting said first chord with said second chord to form said bending beam as a substantially hollow bending beam, said first chord being made of fiber reinforced composite material for taking up said tension stress, said second chord being made of metal for taking up said compression stress.

2. The structural bending beam of claim 1, wherein said fiber reinforced composite material for making said first chord comprises a synthetic resin matrix and fibers embedded in said resin matrix, said fibers being selected from the group of carbon fibers, boron fibers, glass fibers, synthetic fibers and mixtures of these fibers.

3. The structural bending beam of claim 1, wherein said metal for making said second chord is selected from the group of aluminum, aluminum alloys, titanium alloys, and steel alloys.

4. A structural aircraft component comprising, as viewed in a vertical direction, an upper shell section, a lower shell section, and a rib structure interconnecting said upper shell section with said lower shell section to form a substantially hollow bending beam, and wherein one of said shell sections is made of fiber reinforced composite material and the other shell is made of metal.

5. The structural aircraft component of claim 4, wherein said upper and lower shell sections and said rib structure form said bending beam as an aircraft wing.

6. The structural aircraft component of claim 5, wherein said upper shell section is made of metal to take up primarily compression stress, and wherein said lower shell section is made of fiber reinforced composite material to take up primarily tension stress.

7. The structural aircraft component of claim 4, wherein said upper and lower shell sections and said rib structure form said beam as a tail plane and elevator assembly.

8. The structural aircraft component of claim 7, wherein said upper shell section is made of fiber reinforced composite material to take up primarily tension stress, and wherein said lower shell section is made of metal to take up primarily compression stress.

9. The structural aircraft component of claim 4, wherein said fiber reinforced composite material for making said first chord comprises a synthetic resin matrix and fibers embedded in said resin matrix, said fibers being selected from the group of carbon fibers, boron fibers, glass fibers, synthetic fibers, and mixtures of these fibers.

10. The structural aircraft component of claim 4, wherein said metal for making said second chord is selected from the group of aluminum, aluminum alloys, titanium alloys, and steel alloys.

* * * * *

UNITED STATES PATENT AND TRADEMARK OFFICE
CERTIFICATE OF CORRECTION

PATENT NO. : 5,806,798

DATED : Sep. 15, 1998

INVENTOR(S) : Gillandt et al.

It is certified that error appears in the above-identified patent and that said Letters Patent is hereby corrected as shown below:

Col. 1, line 24, after "conventionally" replace "constricted" by --constructed--.

Signed and Sealed this

Twenty-sixth Day of January, 1999

Attest:

Attesting Officer

*Acting Commissioner of Patents and Trademarks*